United States Patent Office 3,424,197
Patented Jan. 28, 1969

3,424,197
INDICATION APPARATUS OF DISPLACEMENT
BY MEANS OF LIQUID PRESSURE
Toru Yanagisawa, Takarazuka, Japan, assignor to Sumitomo Precision Products Company Limited, Amagasaki, Hyogo, Prefecture, Japan
Filed Feb. 21, 1967, Ser. No. 617,649
Claims priority, application Japan, Mar. 25, 1966, 41/18,645
U.S. Cl. 137—557   4 Claims
Int. Cl. F16k *37/00, 31/12*

ABSTRACT OF THE DISCLOSURE

An apparatus for indicating mechanical displacement to indicate correctly and continuously the condition of various kinds of actuators such as the stroke of a cylinder, the rotation angle of a butterfly valve, the extent of opening of a gate valve, etc., at a remote location.

This invention relates to apparatus for indication of mechanical displacement by means of liquid pressure.

The apparatus for indication of mechanical displacement of the present invention can indicate, when combined with a butterfly valve, the degree of rotation thereof and, when combined with a gate valve, the stroke thereof.

An object of present invention is, therefore, to provide an apparatus indicating the degree of opening of any kinds of valves by transducing the displacement of shafts or rods of them to liquid pressure.

Still another object of the present invention is to provide an indication apparatus wherein there will be no delay of indication even if a pipe several hundred meters long is used.

In the drawings accompanied:

Figure 1:
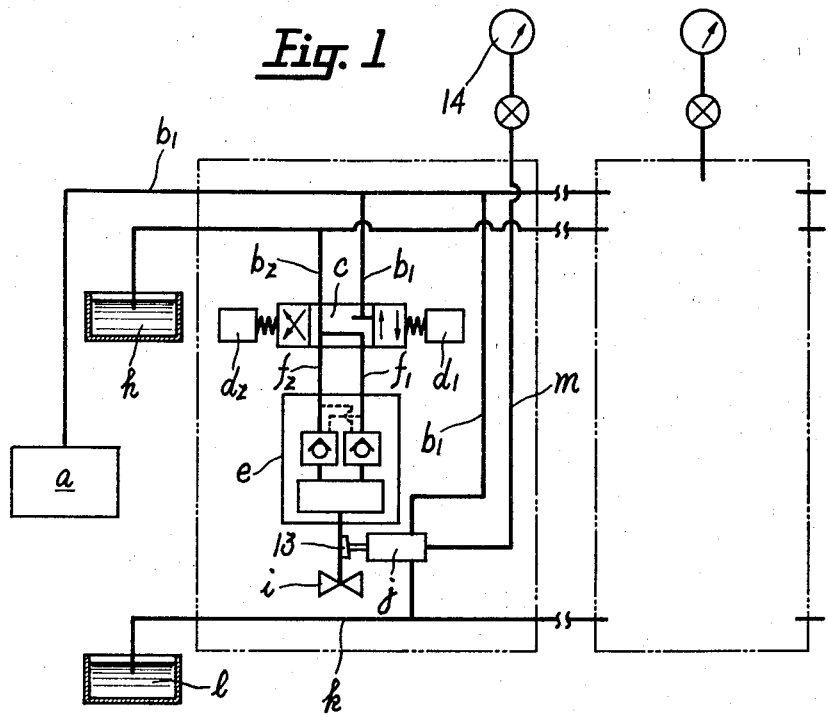
FIG. 1 is a diagram of hydraulic circuit in which the indication apparatus of the present invention is incorporated in a butterfly valve.

First, referring to FIG. 1 a pressure oil accumulated in a power unit $a$ is connected to a four-way control valve $c$ through a pipe $b_1$. This valve is provided with electromagnetic solenoids $d_1$ and $d_2$ on both sides. When the solenoid $d_1$ is energized, the valve $c$ will slide leftward. When electricity is passed to the solenoid $d_2$, the control valve $c$ will slide rightward. A valve actuator $e$ is provided beyond the control valve $c$ and is connected with said valve $c$ through pipes $f_1$ and $f_2$. When the control valve $c$ moves leftward, the pipes $b_1$ and $f_1$ will be connected with each other and the pressure oil will come to the actuator $e$ from power unit $a$ through pipes $b_1$ and $f_1$, and drain oil from the actuator $e$ will be discharged into an oil reservoir $h$ through the pipe $b_2$ and $f_2$. On the other hand, when the control valve $c$ moves rightward, the pipes $b_1$ and $b_2$ will be connected with the pipes $f_2$ and $f_1$, respectively. Therefore, the direction of the oil flow in the valve actuator $e$ will be normal and reverse. By the normal or reverse direction flow, the cam shaft 13 of a butterfly valve $i$ will rotate in either normal or reverse direction. The butterfly valve $i$ set in the bottom part of an oil tank incorporates usually the cam shaft 13. By the rotation of the cam shaft 13, a piston rod 1 (see FIG. 2) in the indication valve $j$ will be moved vertically. A pressure port 5 of the indication valve is connected to the pipe $b_1$. A drain port 6 is connected to an oil reservoir $l$ through a pipe $k$. An indication pressure port 7 is connected to a pressure gauge 14 through a pipe $m$.

Opening and closing device of a butterfly valve in FIG. 1 consists of the electromagnetic four-way control valve $c$, valve actuator $e$ and butterfly valve $i$. The valve actuator $e$ and the butterfly valve $i$ are connected with each other through the shaft which has the cam for indication. The indication valve $j$ is fitted so that the piston rod 1 may be in contact with the cam shaft. The electromagnetic buttons which operate a control valve are located near the pressure gauge 14, and the opening and closing of the butterfly valve may be controlled while the degree of opening of the butterfly valve as shown by the pressure gauge 14 is being seen. The indication valve, valve actuator and four-way control valve are fitted as a set for each butterfly valve in the bottom part of an oil tank. The power unit and oil reservoir are used in common. The electromagnetic buttons are connected with the solenoids $d_1$ and $d_2$ through electric wires and provided near the pressure gauge 14 connected to the indication valve through a pipe $m$. The butterfly valve and the pressure gauge may be located so remotely as to be several hundred meters from each other.

Figure 2:
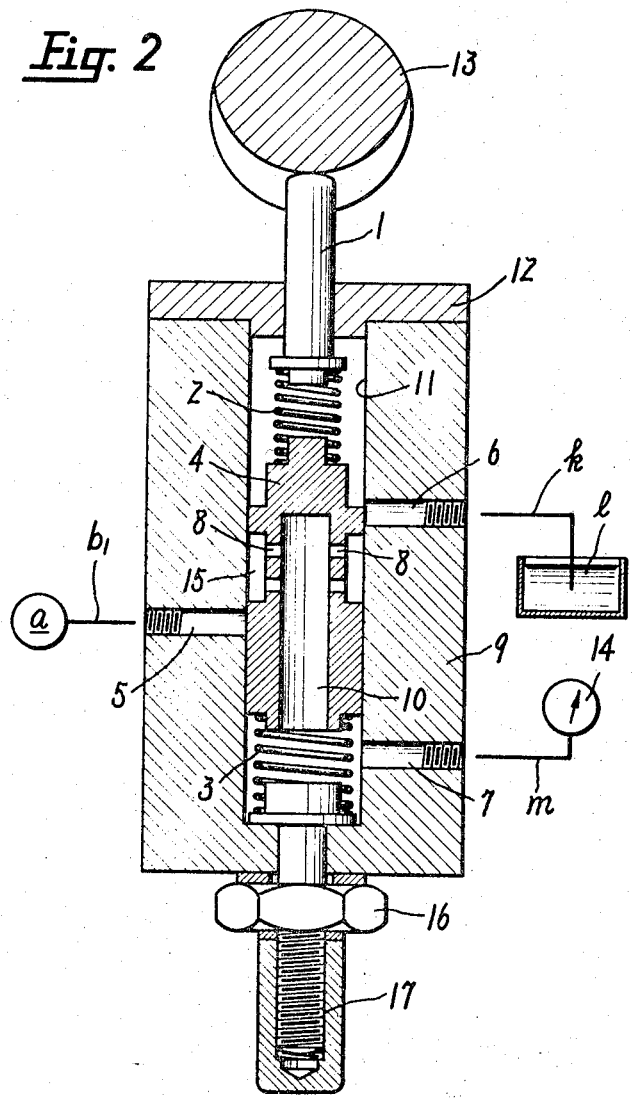
FIG. 2 is a vertically sectioned view of the indicating valve according to the present invention.
Figure 5:
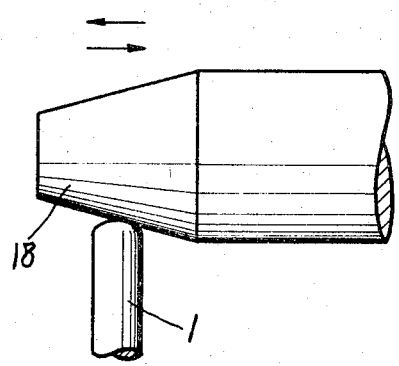
FIG. 5 is an enlarged fragmentary side elevation of a modification.

As illustrated in FIG. 2, in the indication valve, the pressure port 5 is connected to the pipe $b_1$, the pipe $k$ leading to the oil reservoir $l$ is connected to the drain port 6 above the position of said pressure port 5 and the pipe $m$ leading to the pressure gauge 14 is connected to the port 7 below it.

In the upper part of the body 9 of the indicating valve, the piston rod 1 which can be reciprocated up and down by the rotation of the above mentioned cam shaft 13 is closely fitted through an end cover 12. At the lower end of the body, a set screw 17 is passed through the bottom part and a lock nut 16 is screwed on the set screw so that the pressure of a lower spring 3 may be properly adjusted. Further, within the cylindrical chamber 11 of the body 9, a piston 4 provided with an annular chamber 15 having radial ports 8 is supported by an upper spring 2 and the lower spring 3 so that the piston may keep a position of disconnecting the annular chamber 15 with the pressure port 5 and drain port 6. (This position is called a balanced position.) When the piston is in the balanced position, the pressure oil will not be able to flow out into the pressure gauge and oil reservoir. Within the lower part of the above mentioned piston 4, a cylindrical hollow portion 10 having the above mentioned radial ports 8 as an upper limit is provided so that the pressure oil coming to the annular chamber 15 may come to the port 7 through the radial ports 8 and cylindrical hollow portion 10.

Figure 3:
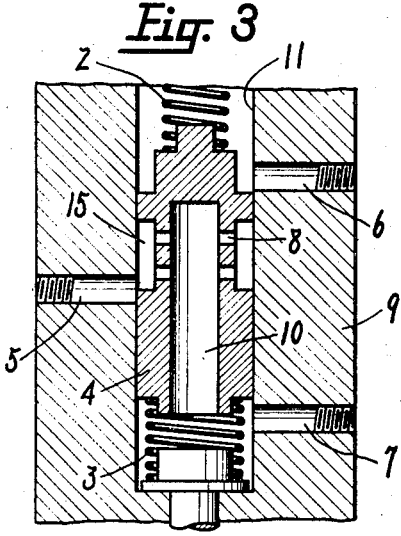
FIG. 3 is an enlarged view of a part of FIG. 2 in which the piston has been lowered.
Figure 4:
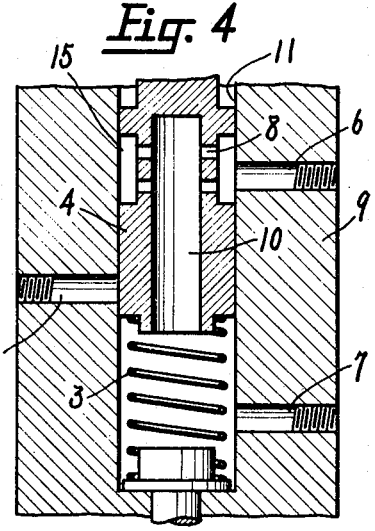
FIG. 4 is an enlarged view of a part of FIG. 2 in which the piston has been raised.

When the cam shaft 13 rotates clockwise from the position shown in FIG. 2, the piston rod 1 will move downward (see FIG. 3). When the cam shaft 13 rotates counter-clockwise, the piston rod 1 will move upward (see FIG. 4). In the case of FIG. 3, the port 5, chamber 15, ports 8, cylindrical hollow portion 10 and port 7 will be connected with one another and the indication pressure in the pressure gauge will rise until the piston returns to the balanced position. On the contrary, in the case of FIG. 4, the port 7, cylindrical hollow portion 10, ports 8, chamber 15 and port 6 will be connected with one another and the indication pressure in the pressure gauge will fall until the piston returns to the balanced position.

The operation of the above mentioned arrangement shall now be explained. When the piston is in the balanced position as in FIG. 2, the pressure port 5 will have no action at all on the indication valve and therefore the piston will remain stationary due to the balancing force of the upper and lower springs. Therefore, if the pointer of the pressure gauge indicates a certain pressure, the pointer will not move and will therefore keep the position. However, when the piston rod is pushed down by the movement of cam shaft 13, the push will be transmitted to the upper spring, the piston will move downward, the pressure port 5 and annular chamber 15 will be connected with each other and the pressure oil will be led to the pressure gauge 14 through the radial ports 8, cylindrical hollow portion 10, port 7 and pipe $m$ and will at the same time push the piston upward against the deflections of the upper and lower springs. Then, the passage of the connection of the pressure port 5 with the annular chamber 15 will become narrower and the pressure increase will begin to reduce. When the passage is finally closed, the pressure increase in the pipe $m$ will stop and the piston will also stop in the position in which the force of the upper and lower springs and the force received from the pressure to which the piston is subjected are balanced with each other. Therefore, the downward displacement can be read in the pressure gauge as an amount of pressure variation. When the piston rod 1 moves upward due to the movement of the cam shaft, the force of the upper spring pushing the piston will reduce and therefore the piston will be pushed upward by the lower spring and the pressure oil existing below the piston. When the piston moves upward, the annular chamber 15 and drain port 6 will be connected with each other and the pressure oil below the piston will flow out into the drain port 6 through the radial ports 8 (see FIG. 4).

Therefore, the pressure below the piston will begin to reduce. When a certain pressure is reached, the force of the upper spring and lower spring and the force to which the piston is subjected by the pressure below the piston will become equal to each other and will be therefore balanced with each other and the upward movement of the piston will stop. But, simultaneously with it, with the reduction of the pressure below the piston, the piston will begin to move downward due to the force of the upper spring. When the piston moves downward, the flow path connecting the annular chamber 15 and the drain port 6 with each other will gradually become narrower until it is closed. Thus the forces acting on the piston will be balanced with each other and the piston will stop. That is to say, when the piston rod 1 moves upward, the pressure below the piston will reduce and therefore the amount of pressure variation set by the displacement of the piston rod will be able to be read in the pressure gauge. By the reading in the pressure gauge, the degree of opening of the butterfly valve $i$ will be found and further, by the degree of opening.

In the above has been explained the apparatus wherein the piston rod of the indication valve is in contact with the cam shaft so that the piston rod may be operated by the normal or reverse rotation of the cam shaft. However, a tapered shaft 18 can be used instead of the cam shaft 13. In such a case, the same effect as of the cam shaft will be able to be obtained by making the direction of the flow of the oil normal or reverse and sliding the tapered shaft forward and rearward.

As the apparatus of the present invention operates as mentioned above, in case the pipe $m$ is exposed, even if the fluid in the pipe $m$ expands or contracts and the volume varies accordingly or even if the oil pressure in the pipe $b_1$ fluctuates, with the slight vertical movement of the piston the pointer of the pressure guage will be kept in a set position and will not be influenced by the pressure variation in the pipe $b_1$. Therefore, even if the pipe $m$ is several hundred meters long, there will be no time lag in the indication and the degree of opening of the butterfly valve will be able to be correctly known.

It has been explained that, in the present invention, the switch of solenoids are set in the place where the pressure gauge is located so that the four-way control valve may be operated while the pressure in the pressure gauge is being seen. However, if this control valve is fitted in the place where the above mentioned pressure gauge is provided and the pipes $b_1$ and $b_2$ and the pipes $f_1$ and $f_2$ are extended to the place where the control valve is located, the four-way control valve will be able to be operated directly by hand without using the solenoids while the pressure in the pressure gauge is being seen. Thus they can be properly modified as the case may be. Further, the apparatus is used not only always for the valve control of the tanker but also can be applied as a series to door opening and closing apparatus, track switching apparatus and the like.

In short, the present apparatus comprises the indication valve which may operate the piston rod through the cam shaft and may act on the pressure gauge through the pipe $m$ so that the degree of opening of the butterfly valve may be indicated and may be controlled by reading the indication.

What is claimed is:

1. A fluid displacement indicating apparatus comprising a valve member, an actuating shaft provided for said valve member, a body, a cylindrical barrel within said body, an oil pressure port, drain port and indicated pressure port made radially in said cylindrical barrel, a piston rod sliding within said cylindrical barrel and actuated by said actuating shaft, an indicating valve including a piston supported by an upper spring and lower spring within said cylindrical barrel and having a cylindrical hollow, annular passage and radial ports connecting said annular passage and cylindrical hollow with each other and a pressure gauge connected to the indicated pressure port of said indicating valve, whereby, by the slide of said piston within the body, said oil pressure port and indicated pressure port may be connected with each other and the indicated pressure port and the drain port may be connected with each other and, when an indicated pressure at which the deflections of the springs located above and below said piston are balanced with each other by the vertical movement of the piston rod is reached, said piston may be in a balanced state in a position of not connecting said three ports.

2. The apparatus according to claim 1 wherein said valve member opening and closing device comprises an electromagnetic four-way change-over valve and a valve actuator.

3. The apparatus according to claim 1 wherein said valve member is provided with a cam shaft by which the piston rod of the indicating valve is to be actuated.

4. The apparatus according to claim 1 wherein said valve member is a vertically movable valve provided with a tapered shaft by which the piston rod of the indication valve is to be actuated.

References Cited

UNITED STATES PATENTS

| 3,189,700 | 6/1965 | Edison | 251—31 XR |
| 3,208,469 | 9/1965 | Gravert | 137—557 XR |
| 3,223,113 | 12/1965 | Hopper | 251—31 XR |

HENRY T. KLINKSIEK, *Primary Examiner.*

U.S. Cl. X.R.

251—31